United States Patent
Shankar

(10) Patent No.: US 9,323,701 B2
(45) Date of Patent: Apr. 26, 2016

(54) TECHNIQUE FOR SYNCHRONIZING IOMMU MEMORY DE-REGISTRATION AND INCOMING I/O DATA

(71) Applicant: NetApp, Inc., Sunnyvale, CA (US)

(72) Inventor: Hari Shankar, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 15 days.

(21) Appl. No.: 14/446,046

(22) Filed: Jul. 29, 2014

(65) Prior Publication Data

US 2016/0034407 A1 Feb. 4, 2016

(51) Int. Cl.
| | |
|---|---|
| G06F 3/00 | (2006.01) |
| G06F 13/28 | (2006.01) |
| G06F 13/00 | (2006.01) |
| G06F 13/10 | (2006.01) |
| G06F 13/38 | (2006.01) |

(52) U.S. Cl.
CPC ............... *G06F 13/28* (2013.01); *G06F 13/10* (2013.01); *G06F 13/385* (2013.01); *G06F 2221/2123* (2013.01)

(58) Field of Classification Search
CPC .............................. G06F 13/28; G06F 13/385
USPC ..................................... 710/22, 7, 10, 18, 104
See application file for complete search history.

(56) References Cited

U.S. PATENT DOCUMENTS

| | | | |
|---|---|---|---|
| 7,917,726 B2 | 3/2011 | Hummel et al. | |
| 8,244,978 B2 | 8/2012 | Kegel et al. | |
| 2003/0163628 A1* | 8/2003 | Lin | 710/315 |
| 2007/0245041 A1* | 10/2007 | Hua et al. | 710/22 |
| 2010/0161850 A1* | 6/2010 | Otsuka | 710/23 |
| 2010/0199009 A1* | 8/2010 | Koide | 710/110 |
| 2014/0281055 A1* | 9/2014 | Davda et al. | 710/26 |

OTHER PUBLICATIONS

Amit, et al.; IOMMU: Strategies for Mitigating the IOTLB Bottleneck, Technion—Israel Institute of Technology, IBM Research Haifa, WIOSCA 2010—Sixth Annual Workshop on the Interaction between Operating Systems and Computer Architecture (2010), (12 pages).
Ben-Yehuda, et al., The Price of Safety: Evaluating IOMMU Performance, Proceedings of the Linux Symposium, vol. 1, Jun. 27-30, 2007 pp. 9-20, (14 pages).

* cited by examiner

*Primary Examiner* — Idriss N Alrobaye
*Assistant Examiner* — Getente A Yimer
(74) *Attorney, Agent, or Firm* — Cesari and McKenna, LLP

(57) ABSTRACT

A technique synchronizes de-registration of registered memory and incoming input/output (I/O) data received from an I/O device for storage in a memory of a computer system. Registration and de-registration of the memory with an I/O memory management unit (IOMMU) are illustratively performed by an I/O device driver of the computer system in anticipation of (or in response to) an I/O request to store the incoming I/O data in buffers of the memory. The synchronization technique ensures that storage of the I/O data in the buffers and de-registration of the buffers occur in a coordinated, reliable manner to obviate data corruption or other error conditions that may manifest in response to a race condition between such data storage and memory de-registration. Notably, I/O data which may be in-flight (i.e., inbound) from a sender to the I/O device may be received without error even when active buffers are deregistered. That is, the technique avoids handshaking with the sender before de-registering the active buffers.

20 Claims, 3 Drawing Sheets

TECHNIQUE FOR SYNCHRONIZING IOMMU MEMORY DE-REGISTRATION AND INCOMING I/O DATA

BACKGROUND

1. Technical Field

The subject matter herein relates to computer systems and, more specifically, to reliable storage of input/output (I/O) data in a computer system.

2. Background Information

An input/output memory management unit (IOMMU) is a component of a computer system (i.e., host) that provides memory protection by controlling access to a memory of the system (i.e., host memory) by input/output (I/O) devices coupled to an I/O controller of the devices. Memory protection typically occurs during direct memory access (DMA) operations wherein I/O data is transferred between an I/O device and the system (host) memory by the I/O controller. Support of DMA operations by the I/O controller allows the controller to access the memory independently of a processor of the computer system, thereby accelerating I/O operations.

Typically, an I/O driver executing on the computer system may register buffers of the memory with the IOMMU prior to initiating an I/O operation for incoming I/O data from an I/O device. The incoming I/O data may be received at the I/O controller, which may then initiate the I/O operation to write the I/O data to the memory, e.g., via a DMA transaction, over an I/O bus (i.e., an interconnect fabric, such as PCIe) for storage in the registered buffers. The IOMMU may intercept the DMA transaction and perform a memory protection check on the I/O data to ensure that destination addresses of the buffers are valid and mapped to the registered memory for the I/O device. After the I/O operation (i.e., DMA transaction) completes, the I/O driver may unregister the memory.

However, there may be unexpected incoming I/O data received from the I/O device or in transit over the interconnect fabric within the DMA transaction that may not have been checked by the IOMMU. If the driver unregisters the memory buffers prior to the protection check for the unexpected I/O data, the IOMMU may determine that there is no valid destination addresses mapped to registered memory for the data. Accordingly, the IOMMU may issue a DMA remapping (DMAR) error. Alternatively, the memory buffers may have been reallocated, e.g., to another I/O device, and registered with the IOMMU, which may incorrectly copy the unexpected I/O data to those buffers, thereby causing data corruption. DMAR errors and data corruption are often manifested as race conditions, which have been previously addressed through handshaking message exchanges between, e.g., the I/O controller and the IOMMU to ensure that there is no storage of unexpected I/O data before unregistering the mapped memory. Yet, such message exchanges are generally inefficient and non-deterministic.

BRIEF DESCRIPTION OF THE DRAWINGS

The above and further advantages of the subject matter herein may be better understood by referring to the following description in conjunction with the accompanying drawings in which like reference numerals indicate identically or functionally similar elements, of which.

OVERVIEW

Figure 1:
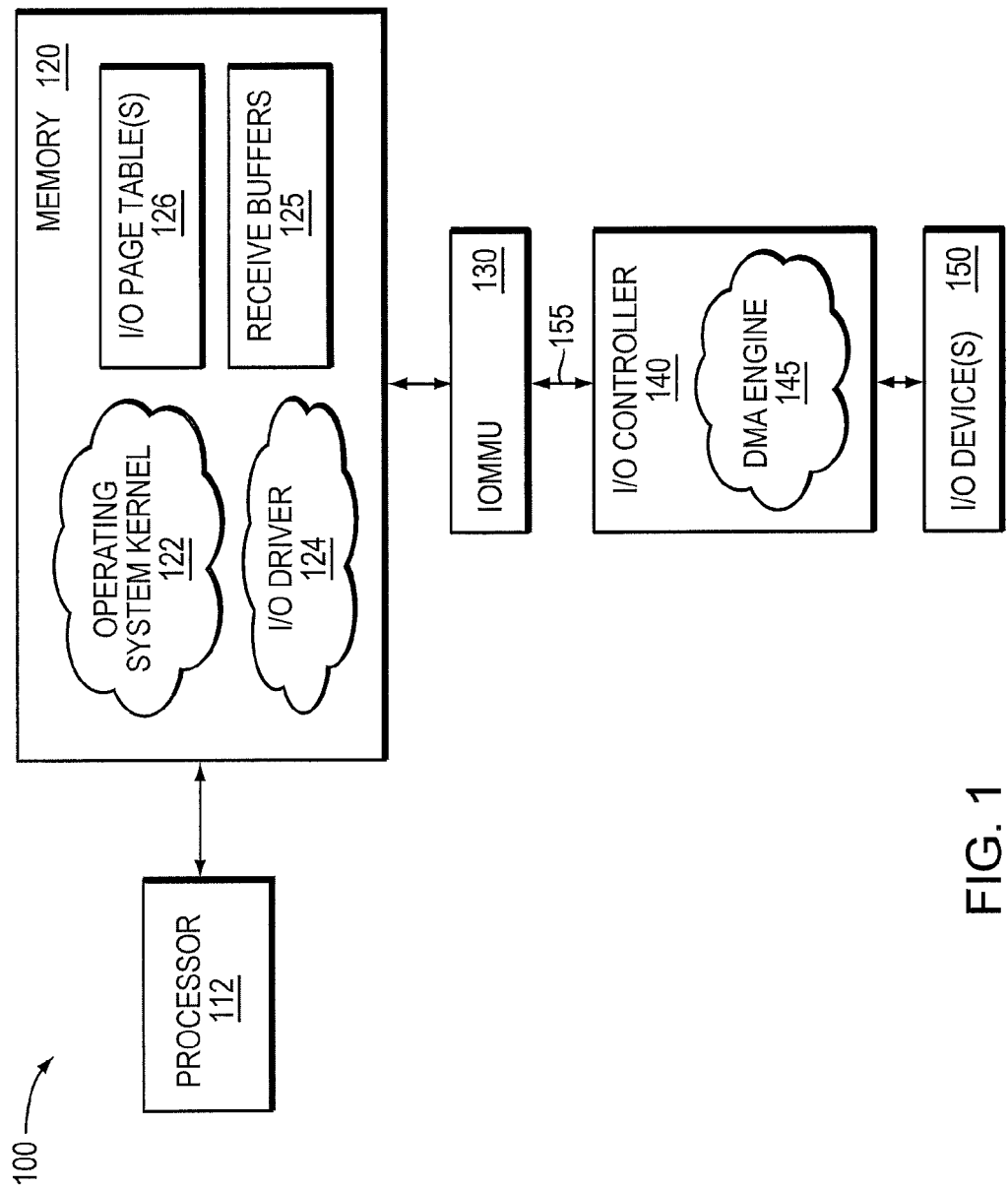
FIG. 1 is a block diagram of a computer system.

The subject matter described herein provides a technique for synchronizing de-registration of registered memory and incoming input/output (I/O) data received from an I/O device for storage in a memory of a computer system. Registration and de-registration of the memory are illustratively performed by computer system software (e.g., an I/O device driver) in anticipation of an I/O request to store the incoming I/O data in buffers of the memory. The synchronization technique ensures that storage of the I/O data in the buffers and de-registration of the buffers occur in a coordinated, reliable manner to obviate data corruption or other error conditions that may arise in response to a race condition between such data storage and memory de-registration.

Illustratively, an I/O device driver registers acquired (e.g., allocated by an operating system kernel) active and dummy buffers with an I/O memory management unit (IOMMU) in anticipation of the I/O request. The I/O driver may then assign the active and dummy buffers to the I/O controller for storing the I/O data, e.g., expected active data, and any unexpected spurious data associated with the I/O request. The I/O driver may configure a direct memory access (DMA) engine of the I/O controller with a virtual address of an I/O device address space and a length specifying an amount of I/O data to transfer to the memory buffers in accordance with a DMA transaction. The IOMMU may translate device virtual addresses of the DMA transaction to memory addresses (i.e., physical addresses) of the active and dummy buffers. Illustratively, the IOMMU may intercept the DMA transaction to determine whether the addresses of the DMA transaction are registered addresses of the buffers in memory (i.e., the active and dummy duffers). In response to determining (i.e., ensuring) that the buffers are registered, the IOMMU may permit the DMA transaction to proceed and copy the expected active data (i.e., I/O data) of specified length to the active buffers and any unexpected spurious data to the dummy buffers. Upon completion of the DMA transaction, the I/O device driver may de-register the active buffers and the dummy buffers of the registered memory.

Advantageously, the synchronization technique described herein employs active buffers to accommodate expected I/O data and dummy buffers to accommodate unexpected, spurious data to enhance reliability of data storage in a manner that avoids race conditions. The race conditions, for example, may result in DMA remapping (DMAR) errors to unregistered memory or data corruption associated with storage of data in registered memory. Notably, the dummy buffers are utilized to store spurious data resulting from DMA transactions prior to reset of I/O channels and reconfiguration of an I/O bus or interconnect fabric. The synchronization technique ensures that no spurious I/O data is loaded into ("hits") any active buffers of registered memory addresses, i.e., buffers that are not expected (i.e., intended) to store such spurious data. When the DMA transaction completes, the I/O driver can ensure that expected active data is loaded into the registered memory addresses of the active buffers and that any unexpected, spurious data is loaded into the dummy buffers. Accordingly, active data which may be in-flight (i.e., inbound) from a sender to the I/O device may be received without a DMAR error even when active buffers are deregistered. That is, the technique avoids handshaking with the sender before de-registering the active buffers.

DESCRIPTION

FIG. 1 is a block diagram of computer system 100 that may be advantageously used with the subject matter described herein. The computer system 100 illustratively includes a memory 120 coupled to one or more processors 112 and to an input/output (I/O) controller 140 via an I/O memory management unit (IOMMU 130). The memory 120 may include a plurality of locations that are addressable by the processor 112 and the I/O controller 140 for storing software programs and data structures associated with the subject matter herein. A portion of the memory 120 may be organized as a set of receive buffers 125 registered with the IOMMU 130 for storing data from the I/O controller 140, as described further herein. The processor 112 may include processing elements or logic adapted to execute the software programs, such as an I/O driver 124, and manipulate the data structures, such as I/O page table(s) 126. Exemplary processors may include families of instruction set architectures based on the x86 central processing unit (CPU) from Intel Corporation of Santa Clara, Calif. and the x64 CPU from Advanced Micro Devices (AMD) of Sunnyvale, Calif.

An operating system kernel 122, portions of which are typically resident in memory 120 and executed by the processor, functionally organizes the computer system by, inter alia, invoking operations in support of the software programs executing on the system. A suitable operating system kernel 122 may include the UNIX® series of operating systems, the Microsoft Windows® series of operating systems, the Linux® operating system and the NetApp® Data ONTAP™ operating system. It will be apparent to those skilled in the art that other types of processing elements and memory, including various computer-readable media, may be used to store and execute program instructions pertaining to the subject matter described herein. Also, while the subject matter herein is described in terms of software programs stored in memory, the programs may be alternatively embodied as modules consisting of hardware, software, firmware, or combinations thereof.

The I/O controller 140 may connect to the IOMMU 130 over an I/O bus or interconnect fabric 155, such as the peripheral component interconnect (PCI) bus. The I/O controller 140 may also connect to one or more I/O devices 150 capable of serial and/or parallel communication, such as a computing device coupled to a network or a storage device, with the controller. Accordingly, the I/O controller 140 may be embodied as a network adapter or storage adapter having the mechanical, electrical and signaling circuitry needed to connect the computer system to the I/O device so as to facilitate transfer of incoming I/O data. The I/O controller 140 may further include a direct memory access (DMA) engine 145 having circuitry configured to transfer the incoming I/O data to the buffers (e.g., receive buffers 125) of the memory 120 as one or more DMA operations or transactions that enable the I/O controller 140 to access the memory 120 independently of the processor 112.

Illustratively, the I/O controller 140 may generate an I/O request, such as a write request, to access memory, e.g., receive buffers 125, to store the incoming I/O data as one or more DMA (write) operations. The DMA operation may be initiated by the I/O driver 124 by, e.g., configuring the DMA engine 145 of the I/O controller 140 to perform the DMA operation and transfer the I/O data as a DMA transaction. To that end, the DMA engine 145 may be provided with one or more device virtual addresses to access the buffers. The IOMMU may intercept the DMA transaction and utilize the I/O page tables 126 to determine whether the memory access is permitted and, if so, resolve the physical address that will be accessed in memory. Illustratively, the IOMMU 130 may translate device virtual addresses to corresponding physical addresses in the memory using the I/O page tables 126 or, alternatively, using cached translations stored, e.g., in an I/O translation buffer of the IOMMU. The I/O page tables 126 stored in memory 120 may include, e.g., page tables as defined in the Intel x86 and AMD x64 system architectures.

As part of the determination as to whether memory access is permitted, the IOMMU 130 may be configured to perform DMA remapping (DMAR) to map (i.e., register) addresses of the memory buffers for the DMA transaction using, inter alia, the I/O page tables 126. The memory buffers may be acquired from the set of receive buffers 125 by the I/O driver 124 in cooperation with the operating system kernel 122. The operating system kernel 122 may further configure the I/O page tables 126 to enable registration and de-registration of the buffers. Illustratively, the I/O device driver may register (e.g., create entries in the I/O page table) buffers with the IOMMU for each DMA transaction and de-register the buffers upon completion of the transaction. Registration and de-registration of buffers preclude the use of stale mappings and access to disallowed buffers, which may result in errors (e.g., DMAR errors) and data corruption if synchronization between registration/de-registration and data storage is not ensured.

Synchronization Technique

The subject matter described herein provides a technique for synchronizing de-registration of registered memory and incoming I/O data received from an I/O device 150 for storage in the memory 120 of the computer system 100. Registration and de-registration of the memory 120 are illustratively performed by the I/O device driver in anticipation of (or in response to) an I/O request from the I/O controller 140 to store the incoming I/O data in buffers of the memory. The synchronization technique ensures that storage of the I/O data in the buffers and de-registration of the buffers occur in a coordinated, reliable manner to obviate data corruption or other error conditions that may manifest in response to a race condition between such data storage in memory and memory de-registration.

Figure 2:
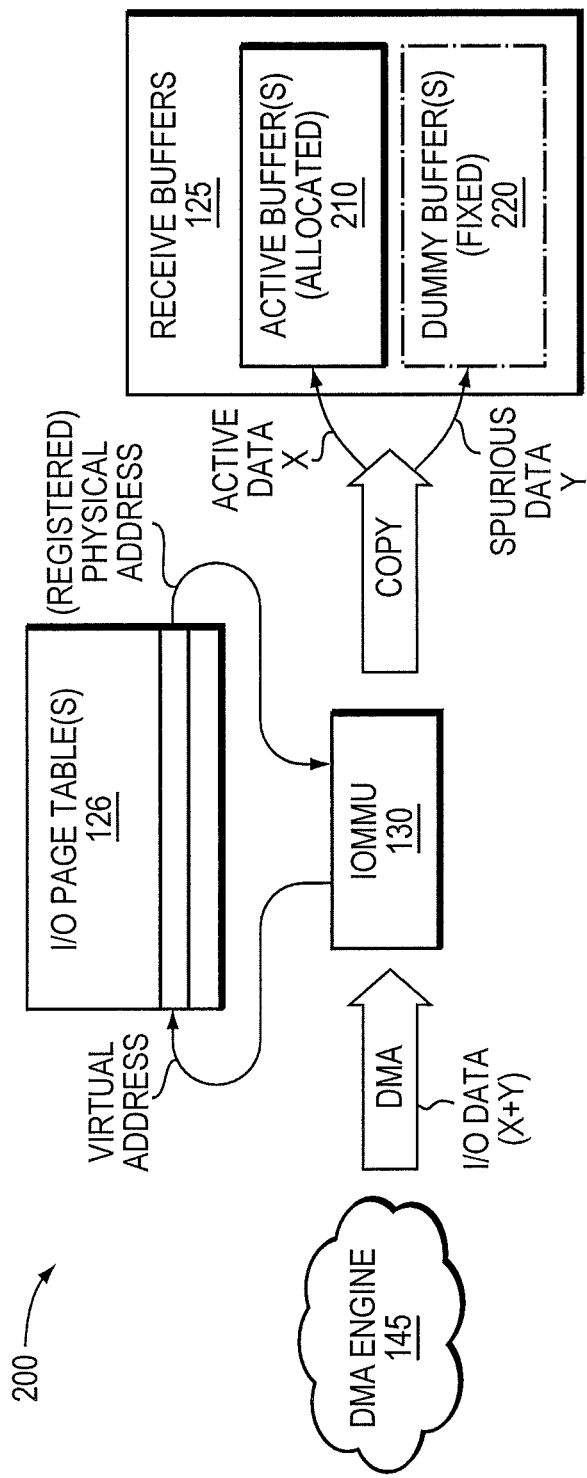
FIG. 2 is a block diagram of an arrangement configured to synchronize de-registration of registered memory and incoming input/output (I/O) data received from an I/O device for storage in a memory of the computer system.

FIG. 2 is a block diagram of an arrangement configured to synchronize de-registration of registered memory and incoming I/O data received from I/O device 150 for storage in the memory 120 of the computer system 100. Assume incoming I/O data is provided by I/O device 150 (e.g., a computing device coupled to a network) and received at the I/O controller 140 (e.g., network adapter). The I/O driver 124, in anticipation of incoming I/O, may acquire one or more buffers from the set of receive buffers 125, register (i.e., assign) the buffers at the IOMMU 130 and allocate those buffers to the I/O controller 140. The I/O controller 140 may, in response to the incoming I/O data, access memory in order to store the incoming I/O data as a DMA (write) operation. Illustratively, the I/O driver 124 may allocate active buffers 210 of the registered memory to the I/O controller for storing the I/O data, e.g., expected active data x, associated with the DMA operation, e.g., a DMA transaction. In addition, the I/O driver 124 may allocate dummy buffers 220 to the I/O controller to store any unexpected, spurious data y associated with the DMA transaction. Once the incoming I/O data is stored in the set of receive buffers, the I/O controller may notify the I/O driver 124, such that additional buffers may be allocated (i.e., posted) to the I/O controller in anticipation of a next incoming I/O. Note the additional buffers may be selected from previously registered buffers or acquired from the set of receive buffers and registered with the IOMMU. In an aspect of the subject matter, the I/O driver 124 may create a list of the active and dummy buffers for use with the DMA operation/transaction associated with the write request, and pass (allot) the buffer list to the I/O controller 140. Illustratively, the I/O driver 124 may construct an input/output vector (iovec) using pointers to the allocated buffer addresses, wherein the iovec is embodied as a scatter-gather list of registered memory buffers that constitute the DMA transaction associated with the write request issued by the I/O controller 140. The scatter-gather list passed to the I/O controller may include first elements embodied as the active buffers 210 and last elements embodied as the dummy buffers 220, wherein the active buffers 210 are mapped to memory addresses of buffers allotted (i.e., assigned) to the I/O controller by the I/O driver 124 and the dummy buffers 220 are mapped to fixed memory addresses of buffers acquired by the driver 124. The I/O controller 140 may then employ the scatter-gather list and the DMA engine 145 to transfer the incoming I/O data to the memory buffers in accordance with the DMA transaction. That is, the I/O driver 124 may configure the DMA engine 145 with a starting, device virtual address and a length specifying an amount of active data to transfer to the active buffers in accordance with the DMA transaction.

The DMA engine 145 may then transfer the active data associated with the DMA transaction to addresses of the active buffers acquired by the I/O driver 124 from the set of receive buffers 125. The IOMMU 130 may intercept the transferred data to determine whether the addresses of the DMA transaction are registered addresses of buffers in memory. Illustratively, the IOMMU 130 may translate the device virtual address(es) to corresponding physical address(es) in the memory using the I/O page tables 126, and examine an appropriate entry of the page tables to perform a memory protection check to ensure that translated (destination) addresses of the buffers are valid and mapped to the registered (i.e., assigned) memory for the I/O controller. In response to ensuring that the buffers are registered, the IOMMU 130 may copy the expected active data x of specified length to the active buffers 210 and copy any unexpected spurious data y to the dummy buffers 220. Upon completion of the DMA transaction, the I/O driver 124 may instruct the IOMMU 130 to de-register the active and dummy buffers of the registered memory; however, the contents (i.e., spurious data) of the dummy buffers 220 mapped to the fixed memory addresses may be maintained, e.g., by the I/O driver, until a determination is rendered that those contents are not valid and can be discarded. Notably, the dummy buffers 220 may be maintained by the I/O driver (i.e., the dummy buffers remain registered with the IOMMU), whereas the driver may constantly register and de-register active buffers 210 with the IOMMU 130.

Once the I/O device 150 resets or a timeout period expires, the contents of the dummy buffers 220 may be rendered invalid and, thus, may be discarded. Where the I/O device 150 is a computing device coupled to a network, the dummy buffer contents may be discarded after (i) the network ports of the I/O controller 140 (i.e., a network adapter) are shut-off, thereby resetting the external network link at the controller, to ensure there is no additional data received at the I/O controller 140 from the network and/or (ii) any I/O data in transit (flowing) over the interconnect fabric 155 is drained, e.g., once the data "hits" the IOMMU 130, in accordance with a timeout period. Note that any I/O data in transit (i.e., in the interconnect fabric) cannot be discarded as that data will hit the mapped memory addresses regardless of whether they are registered or deregistered.

Figure 3:
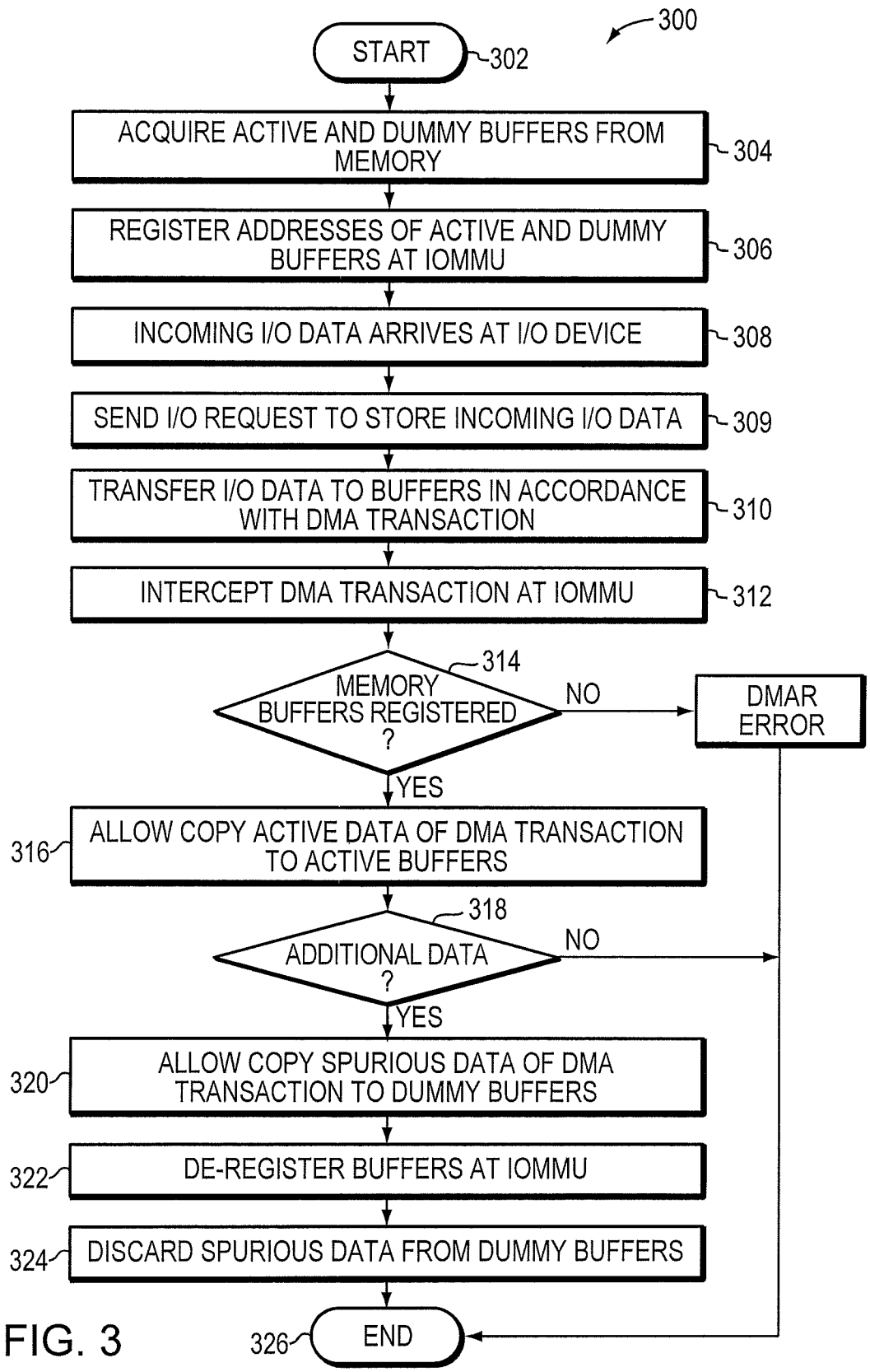
FIG. 3 is an example simplified procedure for synchronizing de-registration of registered memory and incoming I/O data received from the I/O device for storage in the memory of the computer system.

FIG. 3 is an example simplified procedure for synchronizing de-registration of registered memory and I/O data received from the I/O device for storage in the memory of the computer system. The procedure 300 starts at step 302 and proceeds to step 304 where, the I/O driver acquires, e.g., addresses of buffers from the set of receive buffers of the memory needed to satisfy an anticipated I/O request, wherein the memory buffers include active buffers for storing the expected active data associated with the I/O request and dummy buffers for storing any unexpected spurious data of the request. At step 306, the I/O driver registers the addresses of the active and dummy buffers at the IOMMU, and then configures the DMA engine of the I/O controller with an offset (e.g., starting device virtual address) and a length value (e.g., indicating an amount of expected data and the associated device virtual addresses) of the DMA transaction to store the incoming I/O data (of the I/O request) in the buffers. At step 308 the incoming I/O data of the arrives at the I/O device. In response (step 309) an I/O request is sent by the I/O controller to the I/O driver to access memory in order to store the incoming I/O data from the I/O device. At step 310, the DMA engine may cooperate with the I/O driver to transfer the incoming I/O data to the buffers in accordance with the DMA transaction.

At step 312, the IOMMU intercepts the DMA transaction and, at step 314, determines whether the I/O data is destined to registered buffers, i.e., addresses, in memory. If the memory buffers are not registered, a DMA remapping (DMAR) error occurs as there are no valid (i.e., registered) buffers to receive the I/O data. The procedure ends at step 326. However if the memory buffers are registered, the IOMMU copies the I/O data, i.e., expected active data, of specified length transferred within the DMA transaction to the active buffers at step 316 and, at step 318, determines whether there is any additional transferred data. If not, the procedure ends at step 326. However, if there is additional data transferred, the IOMMU copies the additional, unexpected (spurious) data to the dummy buffers at step 320 to complete the DMA transaction. At step 322, the IOMMU may de-register the active and dummy buffers of the registered memory and, upon determining that the contents of the dummy buffers are invalid, the spurious data may be discarded from the dummy buffers at step 324. The procedure then ends at step 326.

Advantageously, the synchronization technique described herein employs active buffers to accommodate expected I/O data and dummy buffers to accommodate unexpected, spurious data to enhance reliability of data storage in a manner that avoids any race condition. The race condition may result in DMAR errors to unregistered memory or data corruption associated with storage of data in registered memory. Notably, the dummy buffers are utilized to store spurious data resulting from DMA transfers prior to reset of I/O channels and reconfiguration of an I/O bus or interconnect fabric. The synchronization technique ensures that no spurious I/O data is loaded into ("hits") any buffers of registered memory addresses, i.e., buffers that are not expected to store such spurious data. When the copy operation completes, the I/O driver can ensure that expected active data is loaded into the registered memory addresses of the active buffers and that any unexpected, spurious data is loaded into the dummy buffers.

The foregoing description has been directed to specific subject matter. It will be apparent, however, that other variations and modifications may be made to the described subject matter, with the attainment of some or all of its advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the subject matter herein. Therefore, it is the object of the appended claims to cover all such variations and modifications as come within the true spirit and scope of the subject matter herein.

What is claimed is:

1. A system comprising:
   a memory configured to store an operating system kernel and an input/output (I/O) driver, a portion of the memory organized as a set of receive buffers having one or more active buffers and one or more dummy buffers;
   an I/O controller adapted for communication with an I/O device, the I/O controller including a direct memory access (DMA) engine configured to transfer incoming I/O data received from the I/O device to the active and dummy buffers of the set of receive buffers as a DMA transaction, the incoming I/O data including expected active data and unexpected spurious data; and
   an I/O memory management unit (IOMMU) coupled between the memory and the I/O controller, the IOMMU configured to intercept the DMA transaction to determine whether the active and dummy buffers are registered buffers with the IOMMU and, in response to determining that the buffers are registered, permit copying of the expected active data associated with the DMA transaction to the active buffers and copying of the unexpected spurious data associated with the DMA transaction to the dummy buffers, wherein the I/O driver is configured to maintain the spurious data of the dummy buffers until a determination is rendered that the spurious data is not valid.

2. The system of claim 1 wherein the active buffers are de-registered with the IOMMU upon completion of the DMA transaction.

3. The system of claim 2 wherein the dummy buffers remain registered with the IOMMU upon completion of the DMA transaction.

4. The system of claim 3 wherein the I/O driver is configured to create a list of the active and dummy buffers registered at the IOMMU and allocate the buffers to the I/O controller.

5. The system of claim 3 wherein the active buffers are deregistered without a handshake to a sender of the I/O data.

6. The system of claim 5 wherein the spurious data is valid data in-flight from the sender when the active buffers are de-registered.

7. The system of claim 2 wherein the DMA engine is configured by the I/O controller with a starting address and a length specifying an amount of the expected active data to transfer to the active buffers in accordance with the DMA transaction.

8. The system of claim 1, wherein the I/O driver is configured to determine whether the spurious data of the dummy buffers is not valid.

9. The system of claim 1 wherein the spurious data of the dummy buffers is discarded in response to reset of the I/O device.

10. A method comprising:
    sending an input/output (I/O) request from an I/O controller to an I/O driver executing on a computer system to access a memory of the system to store incoming I/O data as a direct memory access (DMA) transaction;
    acquiring one or more buffers from a set of receive buffers of the memory needed to satisfy the I/O request, wherein the buffers include active buffers and dummy buffers;
    registering addresses of the buffers with an I/O memory management unit (IOMMU) of the computer system;
    transferring the incoming I/O data to the buffers in accordance with the DMA transaction;
    permitting by the IOMMU copying of expected active data of the DMA transaction to the active buffers; and
    permitting by the IOMMU copying of unexpected spurious data of the DMA transaction to the dummy buffers, wherein the I/O driver is configured to maintain the spurious data of the dummy buffers until a determination is rendered that the spurious data is not valid.

11. The method of claim 10 further comprising receiving the I/O data from an I/O device connected to the I/O controller of the computer system.

12. The method of claim 10 further comprising:
    intercepting the DMA transaction at the IOMMU; and
    performing a memory protection check on the addresses of the buffers at the IOMMU.

13. The method of claim 12 wherein performing the memory protection check comprises ensuring that the addresses of the buffers are valid and registered.

14. The method of claim 10 further comprising:
    de-registering the active buffers with the IOMMU upon completion of the DMA transaction; and
    maintaining registration of the dummy buffers with the IOMMU upon completion of the DMA transaction.

15. The method of claim 14 further comprising:
    determining that the spurious data is invalid; and
    discarding the spurious data from the dummy buffers.

16. The method of claim 15 wherein determining that the spurious data is invalid comprises rendering the spurious data invalid in response to expiration of a timeout period.

17. A non-transitory computer readable medium including program instructions for execution on one or more processors, the program instructions when executed operable to:
    send an input/output (I/O) request from an I/O controller to an I/O driver executing on a computer system to access a memory of the system to store incoming I/O data as a direct memory access (DMA) transaction;
    acquire one or more buffers from a set of receive buffers of the memory needed to satisfy the I/O request, wherein the buffers include active buffers and one or more dummy buffers;
    register addresses of the buffers with an I/O memory management unit (IOMMU) of the computer system;
    transfer the incoming I/O data to the buffers in accordance with the DMA transaction;
    permit copying of expected active data of the DMA transaction to the active buffers; and
    permit copying of unexpected spurious data of the DMA transaction to the dummy buffers, wherein the I/O driver is configured to maintain the spurious data of the dummy buffers until a determination is rendered that the spurious data is not valid.

18. The non-transitory computer readable medium of claim 17 wherein the program instructions when executed are further operable to:
    intercept the DMA transaction at the IOMMU; and
    perform a memory protection check on the addresses of the buffers at the IOMMU.

19. The non-transitory computer readable medium of claim 17 wherein the program instructions when executed are further operable to:
- de-register the active buffers upon completion of the DMA transaction; and
- maintain registration of the dummy buffers upon completion of the DMA transaction.

20. The non-transitory computer readable medium of claim 19 wherein the program instructions when executed are further operable to:
- determine that the unexpected spurious data is invalid; and
- discard the spurious data from the dummy buffers.

* * * * *